US00RE41034E

(19) United States
(12) Reissued Patent
Lilley et al.

(10) Patent Number: US RE41,034 E
(45) Date of Reissued Patent: Dec. 15, 2009

(54) POWER COMBINING APPARATUS FOR HYBRID ELECTRIC VEHICLE

(75) Inventors: Timothy J. Lilley, Binghamton, NY (US); Grantland I. Kingman, Fishers, IN (US)

(73) Assignee: BAE Systems Controls Inc., Johnson City, NJ (US)

(21) Appl. No.: 11/705,797

(22) Filed: Feb. 13, 2007

Related U.S. Patent Documents

Reissue of:
(64) Patent No.: 6,455,947
Issued: Sep. 24, 2002
Appl. No.: 09/782,836
Filed: Feb. 14, 2001

(51) Int. Cl.
*B60L 11/12* (2006.01)

(52) U.S. Cl. ..... 290/40 C; 180/65.6
(58) Field of Classification Search ..... 290/40 C, 290/17, 1 C, 4 C; 180/65.2, 69.6, 65.6
See application file for complete search history.

(56) References Cited

U.S. PATENT DOCUMENTS 4,588,040 A 5/1986 Albright, Jr. et al.
4,815,334 A 3/1989 Lexen
4,862,009 A 8/1989 King
5,117,931 A 6/1992 Nishida
5,120,282 A 6/1992 Fjallstrom
5,193,634 A 3/1993 Masut
5,337,848 A 8/1994 Bader
5,509,491 A 4/1996 Hall, III
5,558,175 A 9/1996 Sherman
5,562,565 A 10/1996 Moroto et al.
5,577,973 A 11/1996 Schmidt
5,603,671 A 2/1997 Schmidt
5,637,987 A 6/1997 Fattic et al.
5,713,814 A 2/1998 Hara et al.
5,775,449 A 7/1998 Moroto et al.
5,813,488 A 9/1998 Weiss
5,818,116 A 10/1998 Nakae et al.
5,839,533 A 11/1998 Mikami et al.
5,846,155 A 12/1998 Taniguchi et al.
5,869,950 A 2/1999 Hoffman, Jr. et al.
5,881,559 A 3/1999 Kawamura
5,910,722 A 6/1999 Lyons et al.
5,929,595 A 7/1999 Lyons
5,935,035 A 8/1999 Schmidt
5,943,918 A 8/1999 Reed, Jr. et al.
5,945,808 A 8/1999 Kikuchi et al.
5,950,752 A 9/1999 Lyons
5,959,420 A 9/1999 Boberg et al.
5,982,045 A 11/1999 Tabata et al.
6,008,545 A 12/1999 Nagano et al.
6,018,198 A 1/2000 Tsuzuki et al.
6,022,048 A 2/2000 Harshbarger et al.
6,054,776 A 4/2000 Sumi
6,155,364 A 12/2000 Nagano et al.
6,170,587 B1 1/2001 Bulluck (Continued)

*Primary Examiner*—Nicholas Ponomarenko
(74) *Attorney, Agent, or Firm*—Scully, Scott, Murphy & Presser, P.C.; Paul J. Esatto, Jr.

(57) ABSTRACT

A power combining apparatus for a hybrid electric vehicle comprises a planetary gear set comprising a sun gear, a ring gear connected to an output shaft, a plurality of planet gears, and a carrier assembly rotatably supporting the plurality of planet gears journaled with the sun and ring gears. A torque transmitting arrangement is coupled to the sun gear and to the shaft of the variable power source for influencing rotation of the sun gear according to the rotation of the variable power supply shaft for causing rotation of the sun gear, thereby influencing rotation of the ring gear and the output shaft. The carrier assembly of the planetary gear arrangement is selectively connectable to the constant power source for selectively influencing rotation of the carrier assembly of the planetary gears and the ring gear, to thereby influence rotation of the output shaft.

20 Claims, 6 Drawing Sheets

U.S. PATENT DOCUMENTS 6,306,057 B1 10/2001 Morisawa et al.
6,409,623 B1 6/2002 Hoshiya et al.
6,491,599 B1 12/2002 Schmidt
6,592,484 B1 7/2003 Tsai et al.
6,655,485 B1 12/2003 Ito et al.
2002/0036106 A1 3/2002 Hanyu et al.

POWER COMBINING APPARATUS FOR HYBRID ELECTRIC VEHICLE

Matter enclosed in heavy brackets [ ] appears in the original patent but forms no part of this reissue specification; matter printed in italics indicates the additions made by reissue.

BACKGROUND OF THE INVENTION

Hybrid electric vehicles (HEVS) combine the internal combustion engine of a conventional vehicle with the battery and electric motor of an electric vehicle. This results in an increase in fuel economy over conventional vehicles. This combination also offers extended range and rapid refueling that users expect from a conventional vehicle, with a significant portion of the energy and environment benefits of an electric vehicle. The practical benefits of HEVs include improved fuel economy and lower emissions compared to conventional vehicles. The inherent flexibility of HEVs also permits their use in a wide range of applications, from personal transportation to commercial hauling.

A parallel hybrid electric vehicle requires that a power path for both constant and variable power be present. That is, a parallel hybrid electric vehicle uses power from both a mechanical source such as an internal combustion engine as well as an electrical source. This permits the HEV to use a smaller engine as the mechanical source. The smaller engine size and system operating characteristics provide even greater performance or improved fuel economy with lower emission. A significant challenge, however, in the design of HEVs, has been to produce a drive system that takes advantage of the high efficiency of mechanical components and the versatility of electrical components.

In the past, various types of parallel hybrid systems have been proposed for multiple use applications such as automobiles. For example, planetary gear sets have been used in automatic transmissions for many years. However, most automatic transmissions use a double planetary gear set such as a Simpson or Ravigneaux set. The typical automatic transmission uses only a single power source for the vehicle. Accordingly, it is desirable to provide a drive system which allows the system to operate at its most efficient power transmission point where the system spends most of its time while providing a means of generating the torque required to accelerate the vehicle without having a multi-gear ratio transmission. It is further desirable to provide a drive system that enables each source (mechanical or electrical) in the system to operate either independently or in conjunction with one another for transferring power to an output device.

SUMMARY OF THE INVENTION

A vehicle transmission system adapted for receiving inputs from variable and constant power sources for driving an output shaft comprises a planetary gear set comprising a sun gear, a ring gear connected to the output shaft, a plurality of planet gears, and a carrier assembly rotatably supporting the plurality of planet gears journaled with the sun and ring gears. A torque transmitting arrangement is coupled to the sun gear and to the shaft of the variable power source for influencing rotation of the sun gear according to the rotation of the variable power supply shaft, thereby influencing rotation of the ring gear and the output shaft connected thereto. The carrier assembly of the planetary gear arrangement is selectively connectable to the constant power source via a clutch and brake mechanism for selectively influencing rotation of the carrier assembly of the planetary gears and the ring gear, to thereby influence rotation of the output shaft.

A vehicle transmission system having a drive shaft which can be driven continuously or at varying speeds and operable in a first mechanical mode, a second electrical mode, or a third combined mode of operation, comprises a combining planetary gear arrangement having a plurality of members and operatively coupled to a rotatable shaft of a variable power source, a rotatable shaft of a constant power source, and to the output drive shaft. A clutch and brake mechanism is operable in the first and third modes for connecting the constant power source with a member of the combining planetary gear arrangement for establishing a drive path in the combining planetary gear arrangement for influencing rotation of the output shaft according to a rotation direction of the constant power source shaft, and in the second mode for grounding the member of the combining planetary gear arrangement for preventing rotation of the output drive shaft from being influenced by the constant power source. A torque transmitting arrangement is coupled to another member of the combining planetary gear arrangement and responsive to the variable power source for influencing rotation of the output shaft according to a rotation direction of the shaft of the variable power source in the second and third modes of operation, and in the first mode of operation, for producing sufficient torque to prevent rotation of the another member for preventing rotation of the output drive shaft from being influenced by the variable power source. The variable power source is driven to a synchronizing speed to enable the transmission system to change modes.

BRIEF DESCRIPTION OF THE DRAWINGS

Various advantages of the invention will become more apparent by reading the following detailed description in conjunction with the drawings, which are shown by way of example only, wherein.

DETAILED DESCRIPTION OF THE INVENTION

As described herein, the collection transmission system of the present invention utilizes a planetary gear set to combine and transmit power from multiple inputs through to a single output. The gear set is enclosed in a case that can accept the output shaft of one or more variable power supplies and an output shaft from a constant power source. The output of this system is in the form of a shaft that can be adapted to drive various loads. The entire system is supported through mounting sockets on the case.

Figure 1:
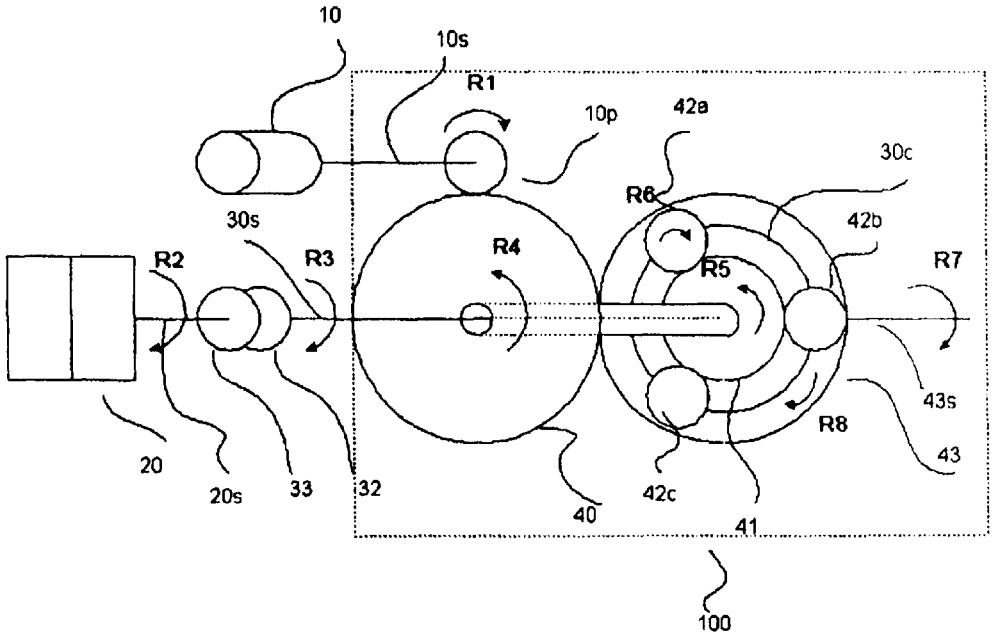
FIG. 1 is a schematic illustration a power combining apparatus according to an embodiment of the present invention.

Referring now to the drawings, wherein like reference numerals indicate like parts, and in particular to FIG. 1, there is shown a schematic illustration of a power combining collection transmission system 100 according to an embodiment of the present invention. As shown in FIG. 1, the system 100 comprises a planetary gear set comprising a sun gear 41, a ring gear 43 directly connected to an output shaft 43s, a plurality of planet gears 42a, 42b, and 42c, and a carrier assembly 30c rotatably supporting the plurality of planet gears 42a–c journaled with the sun gear 41 and ring gear 43. A torque transmitting arrangement comprises pinion gear 10p and bull gear 40. Bull gear 40 is operatively coupled to the sun gear and to the pinion gear 10p which accepts shaft 10s of variable power source 10 such as a reversible electric motor for influencing rotation of the sun gear according to the rotation of the variable power supply shaft. This in turn influences rotation of ring gear 43 and output shaft 43s coupled thereto. The carrier assembly 30c of the planetary gear arrangement is operatively connected to carrier shaft 30s which runs coaxial with sun gear 41. The carrier assembly 30c is selectively connectable to shaft 20s of constant power source 20 such as an internal combustion engine via clutch mechanism 33 for selectively influencing rotation of the carrier assembly of the planetary gears and the ring gear, thereby influencing rotation of output drive shaft 43s.

As one can ascertain from the above description, the transmission system of FIG. 1 preferably uses one or more reversible electric motors as its variable power source 10. The motor is connected directly to the gear case and drives through pinion 10p that meshes with single bull gear 40. The bull gear 40 is fixed directly to and meshes with sun gear 41 of the planetary set. The constant power source 20 is preferably in the form of an internal combustion engine that runs at a constant speed with limited torque feedback. Constant power source 20 is connected to the carrier through clutch mechanism 33.

Operation of the above system is as follows. In order to produce power at the output 43s of collection transmission 100, an input power must be provided from constant power source 20, variable power source 10, or both. As shown in FIG. 1, constant power source 20 transmits its power through its shaft 20s to clutch mechanism 33 comprising conventional clutch member 33 and brake member 32 to the carrier 30c of the planetary set. The clutch, which may be a fluid-operated clutch, and brake are conventional control devices used with power transmissions. In FIG. 1, the rotation R2 of the shaft 20s of constant power supply 20 creates a rotation R3 of carrier shaft 30s. This rotation R3 is transmitted to the carrier 30c via carrier shaft 30s to produce rotation R8 which is combined with rotation R5 of sun gear 41 to produce rotation R7. The power is then transmitted through the ring gear 43 directly connected to output shaft 43s. In a preferred embodiment, the ratio between these components (i.e the carrier and the ring gear) is approximately a 1.3 to 1 decrease in torque.

The variable power supply 10 transmits its power through its shaft 10s to the pinion gear 10p into the bull gear 40 directly connected to sun gear 41. In FIG. 1, a specific rotation R1 of the shaft of variable power supply 10 causes a rotation R4 of the bull gear 40 which is directly transmitted to sun gear 41. This rotation causes the planet gears 42a–c to rotate in direction R6, thus creating the rotation R7 of ring gear 43. In a preferred embodiment, this results in a speed reduction of approximately 5:1 and an increase in torque. The input power is then transmitted through planet gears 42a–c to ring gear 43 connected to the output. Preferably, the speed ratio between the sun gear and ring gear is approximately 3 to 1.

This system of the present invention can operate in three different modes, the first of which uses the variable power source to provide the total power output. With clutch 33 disengaged and brake 32 engaged in the clutch/brake mechanism, it is possible to stop the rotation of the shaft 30s and the carrier 30c by providing a defined amount of reaction torque dependent on the ratios of the gears in the planet set 42a–c and relative to the torque applied by the variable power supply. The power then moves through the bull gear 40 to the sun gear 41, then from the sun gear 41 through the planets to ring gear 43, which is directly connected to the output drive shaft 43s.

The second mode utilizes the constant power supply 20 to provide the output power to drive shaft 43s. With the variable power supply 10 producing enough torque on the system to stop the sun gear 41 from rotating, the power path for the constant power supply 20 is isolated and the power is transmitted through clutch mechanism 33 to the carrier 30c. The carrier 30c cooperates with sun gear 41 to pass the power through the planets 42a–c to the ring gear 43 to drive output shaft 43s. In this mode the clutch is engaged and the brake disengaged so as to establish a drive path for transmitting the power from constant power source 20 to output drive shaft 43s through the combining planetary gear set.

Figure 4:
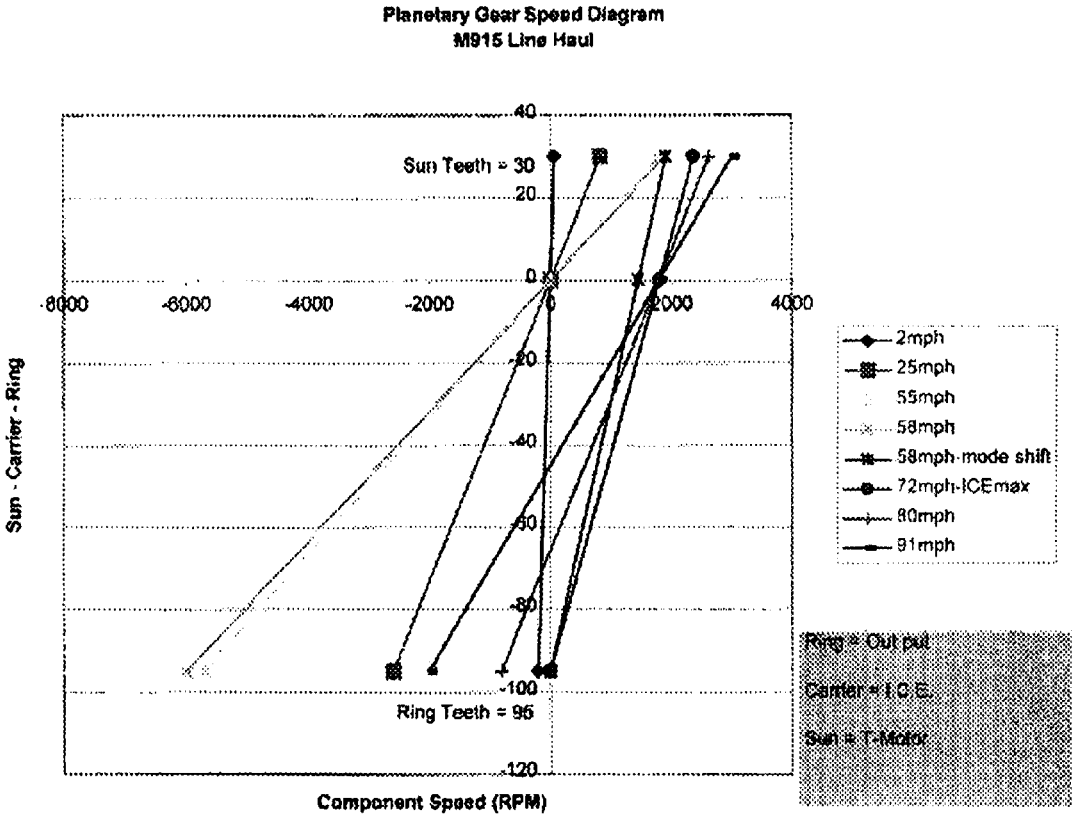
FIG. 4 is a graphical representation of the speed of rotation of each component in the planetary gear system through the different modes according to an aspect of the present invention.

The third mode of operation combines power contributions from both the constant power supply 20 and variable power supply 10. In this mode, the clutch 33 is engaged and the brake 32 is off in the clutch/brake mechanism. The power then flows from each component as described in the previous two modes until they reach the planet set which splits the torque contributions for each depending on the assigned ratios. The speed of rotation of each component in the planetary gear system through the different modes is illustrated in FIG. 4.

A further advantageous feature of the system according to the present invention is that the variable power supply 10 is driven to a point of a synchronizing speed when the transmission changes modes. This allows the mode change point to be selected such that the majority of the power is supplied by the fixed speed or mechanical power source 20. The less efficient variable speed power source supplies a smaller percentage of the power but is still available to assist in situations where more power is required such as passing and climbing grades at high speed. This enables the system to run at its most efficient power transmission point where the system spends most of its time and provides a means of generating the torque required to accelerate the vehicle without using a multi-gear ratio transmission.

In a particular embodiment, when the vehicle is accelerated to a predetermined speed, for example, 52 mph, the brake holding the carrier 30c fixed is released. This allows the carrier components to spin up to speed to match the engine output shaft. This is accomplished by driving the electric motor(s) to a synchronizing speed for synchronizing with the fixed power source. In a particular embodiment, this is accomplished by transitioning the electric motor(s) from a given speed/rotation (e.g. 15000 rpm) to a second speed/rotation (e.g. −1300 rpm), for example, to limit clutch slippage. When the motor(s) reach the synchronizing speed, the carrier is at the engine operating speed. The ring gear is connected to the output drive shaft and to the axles via a final drive such that the vehicle momentum is used to turn the ring gear, thereby helping to synchronize the speed. Once the traction motor(s) are at the synchronizing speed, the clutch can be locked to provide a direct drive between the engine and the rear axle. The carrier, the ring gear and the motor are linked via the planetary gear set so that knowledge of two of the components of the system enables one to determine the third component.

As one can ascertain, three major events occur during the transfer between the source of power from variable to mechanical. First, the brake in the clutch/brake mechanism between the constant power source and the planetary gear set is disengaged. Second, the variable power source is driven to a synchronizing speed so that the power before and after the transfer is as close to the same value as possible. Finally, the constant power supply is speed synchronized with the carrier of the planetary set as closely as possible to limit clutch slip as the clutch in the aforementioned clutch/brake mechanism is engaged.

Figure 2:
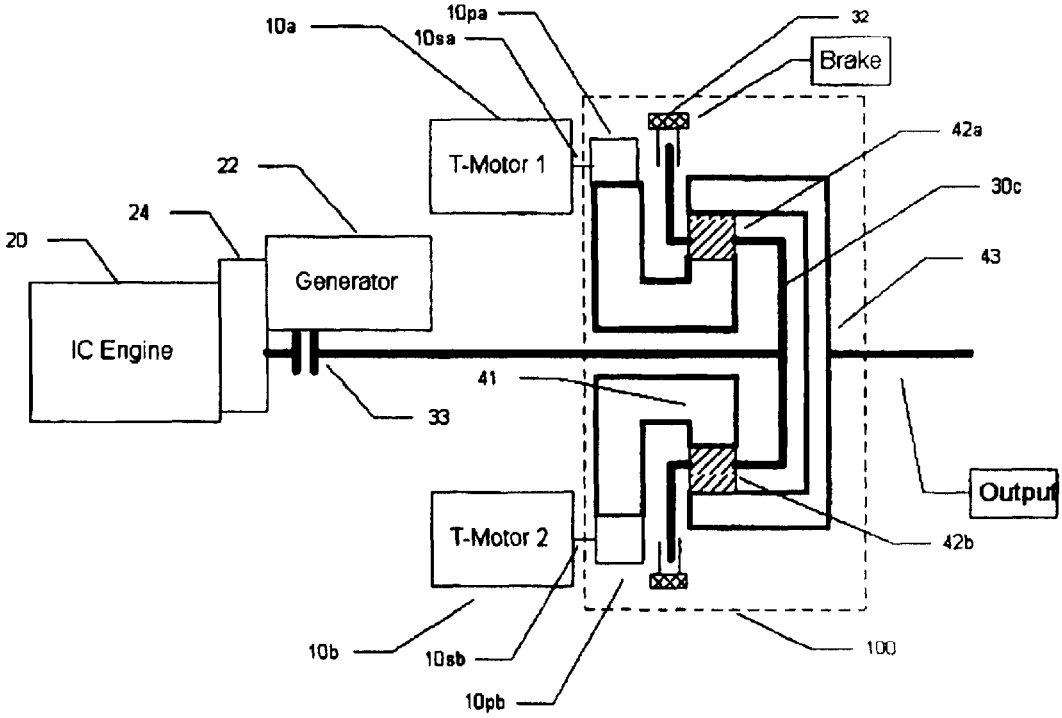
FIG. 2 is a more detailed cross sectional view of a power combining apparatus according to an embodiment of the present invention wherein two variable power sources are utilized.

The collection transmission can be employed with one or more variable power sources 10 connected to the bull gear 40 so long as the power sources are matched such that the output speeds are synchronous. FIG. 2 illustrates such a configuration. As shown in FIG. 2, two electric traction motors 10a and 10b are connected to the bull gear 40 via pinions 10pa and 10pb, respectively and speed synchronized to provide the variable power source to the collection transmission 100. Internal combustion engine 20, coupled to conventional gear box 24, is used to provide power for the electric motors 10a, 10b through a generator 22 as well as providing a direct or parallel path of power to the final drive of the vehicle via drive shaft 43s. The gear case can be made of a suitable material such as a metal, for example, that will be strong enough to support the internal components and have mounting sockets located such that the gear case can be attached in a known manner to a stationary object. Preferably, the gear case housing the collection transmission system is bolted directly to the engine.

In stop and go traffic, a parallel HEV that incorporates the present invention may, for example, operate in the first "electrical only" mode of operation approximately 33% of the time. The generators are used to supply power to the motor or motors. A battery or batteries (not shown) may also be used and coupled to the electric motors to absorb power during acceleration. During deceleration, the energy normally dissipated as heat in the brakes may be re-routed and stored in the batteries thereby providing additional fuel economy, less engine cycling and enhanced efficiency. Moreover, in conventional transmission systems such as a typical eight speed transmission, eight different gear ratios are needed, with only the top two gear ratios typically used for highway travel. The remaining gear ratios are used in stop and go traffic to accelerate/decelerate the vehicle. In the present invention, the electric motors may be used to accelerate the vehicle up to highway speeds (e.g. about 50 mph) before switching over to a parallel combination of electrical and mechanical power, and then ultimately transitioning completely over to mechanical power.

Figure 3A:
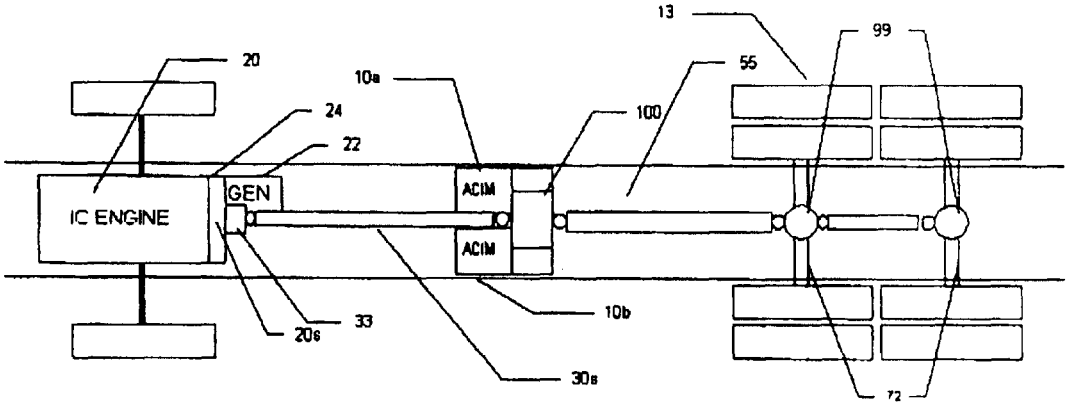
FIG. 3A is a top view schematic of the power combining apparatus embodied in a parallel hybrid electric truck configuration.
Figure 3B:
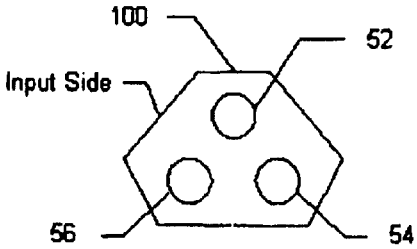
FIG. 3B is a more detailed schematic view of the output side of the gearbox assembly of FIG. 3A.
Figure 3C:
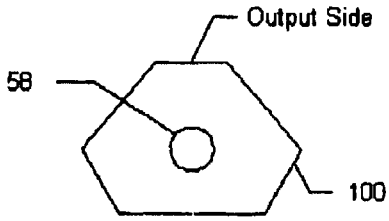
FIG. 3C is a more detailed schematic view of the input side of the collection transmission box assembly of FIG. 3A.

FIG. 3A shows a block diagram of the embodiment shown in FIG. 2 incorporated within a parallel hybrid electric vehicle configuration such as a line haul truck. As shown in FIG. 3A, internal combustion engine 20 such as a diesel engine is operatively coupled to clutch mechanism 33 via gear box 24 and shaft 20s. Gear box 24 also operatively connects internal combustion engine 20 to generator 22. The gear box operates in conventional fashion by having an input for the IC engine output and providing an output for generator 22 and an output for shaft 20s upstream of clutch 33 via a gear reduction mechanism. Reversible electric motors 10a, 10b represent the variable power sources operatively coupled to inputs 54 and 56 (see FIG. 3B) of collection transmission system 100. The system includes input 52 (see FIG. 3C) coupled to clutch mechanism 33 via carrier shaft 30s for receiving power from the constant power source. The output 58 (see FIG. 3C) of collection transmission system 100 is adapted to accommodate output drive shaft 43s for connection to final drive 55. Final drive 55 is in turn operatively connected via differential 99 to wheel axle shaft 72 for driving vehicle wheels 13. In a preferred embodiment, the variable power source 10 represented by electric motors 10a, 10b are each 250 horsepower (HP) reversible motors. The constant power source is preferably a 460HP diesel engine.

FIGS. 5–9 illustrate schematic diagrams of alternative embodiments of the power combining apparatus of the present invention. These embodiments employ configurations that utilize coaxial shafts that create an inline envelope for the entire system. This is advantageous in that these configurations provide a package that will fit into the space occupied by conventional vehicle transmission systems, thereby making it easier for manufacturers to integrate a hybrid drive system into a current production vehicle. The embodiment illustrated in FIG. 5 uses a variable power source 10 that is tuned to provide the torque and speed characteristics required to produce the desired output from the planetary gearbox. The embodiments depicted in FIGS. 6–9 utilize a reduction scheme to incorporate a variable power supply for adaptation to a particular application. Each of these figures illustrates a hybrid electric power train depicting a generator, motor, and collection transmission.

Figure 5:
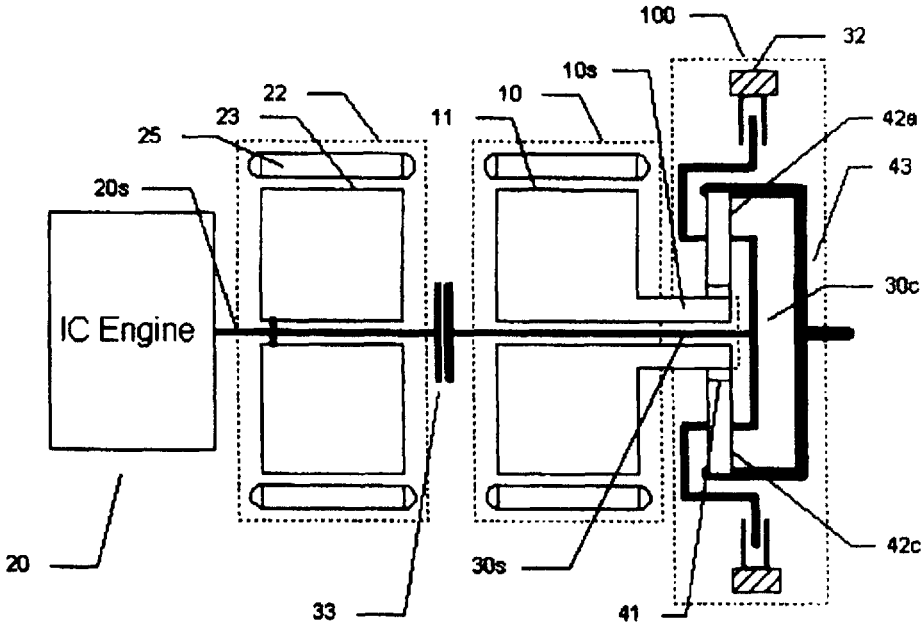
FIG. 5 is a schematic cross sectional view of an in-line parallel hybrid electric vehicle transmission incorporating a power combining apparatus according to an alternate embodiment of the present invention.

The embodiment shown in FIG. 5 illustrates the in-line configuration where the rotor shaft 11 of a suitable motor is mounted rigidly to the sun gear 41 of the collection transmission or combining gearbox 100. A single hollow rotor motor 10 is used to pass the carrier shaft 30s directly through the sun gear 41 without the need for pinion and bull gears. The generator 22 includes rotor 23 and stator 25. The rotor 23 of the generator is rigidly mounted to the output shaft 20s from the torsional damper (not shown) on the engine. Clutch 30 is used to engage and disengage the carrier drive shaft 30s, and brake 32 has been incorporated to ground the carrier 30c to the external wall of the transmission.

Figure 6:
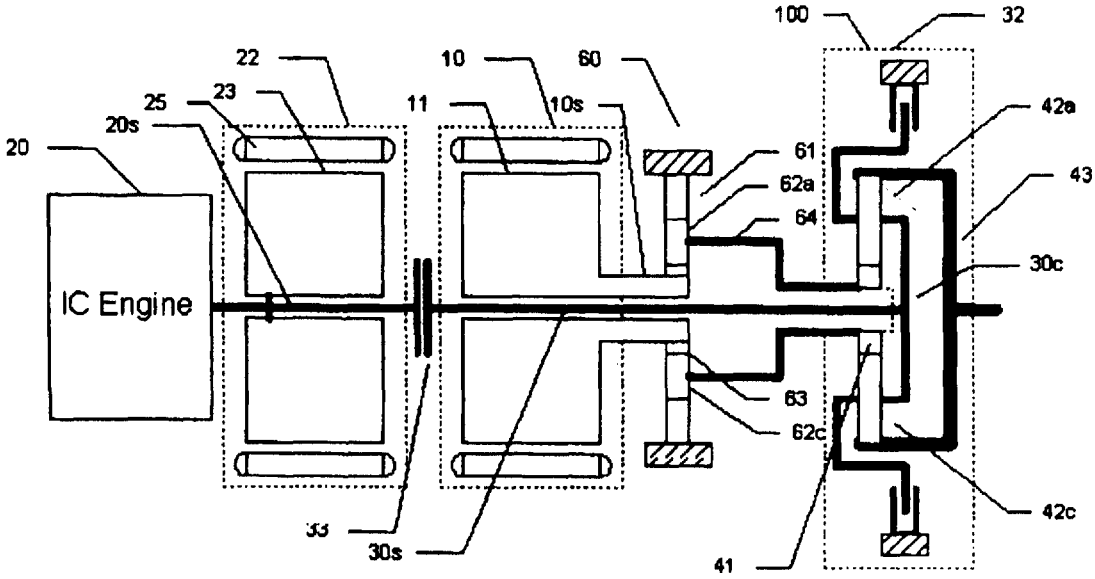
FIG. 6 is a schematic cross sectional view of an in-line parallel hybrid electric vehicle transmission incorporating a power combining apparatus according to a second alternate embodiment of the present invention.
Figure 7:
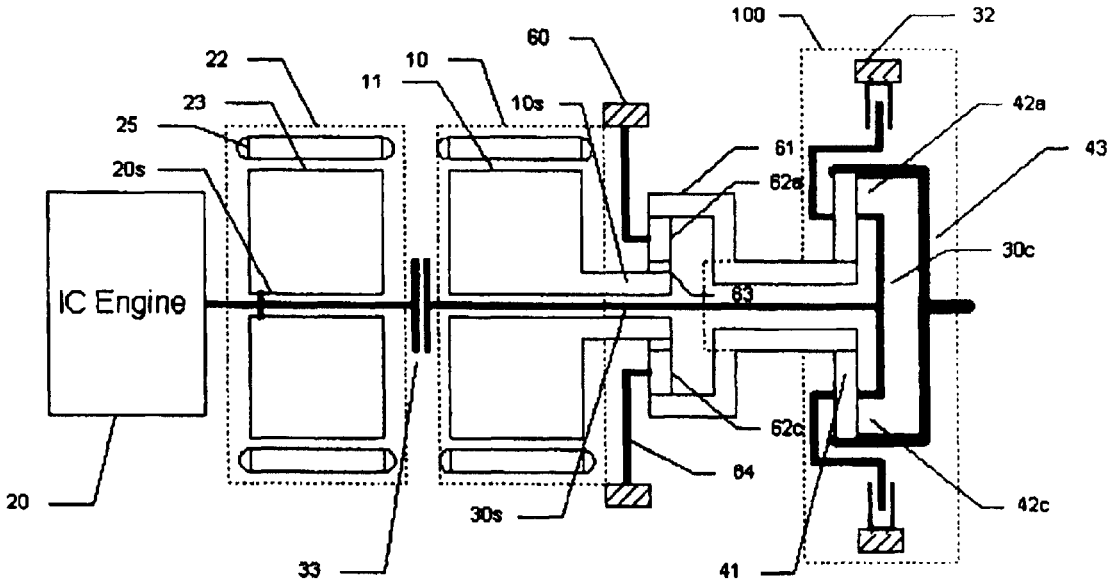
FIG. 7 is a schematic cross sectional view of an in-line parallel hybrid electric vehicle transmission incorporating a power combining apparatus according to a third alternate embodiment of the present invention.
Figure 8:
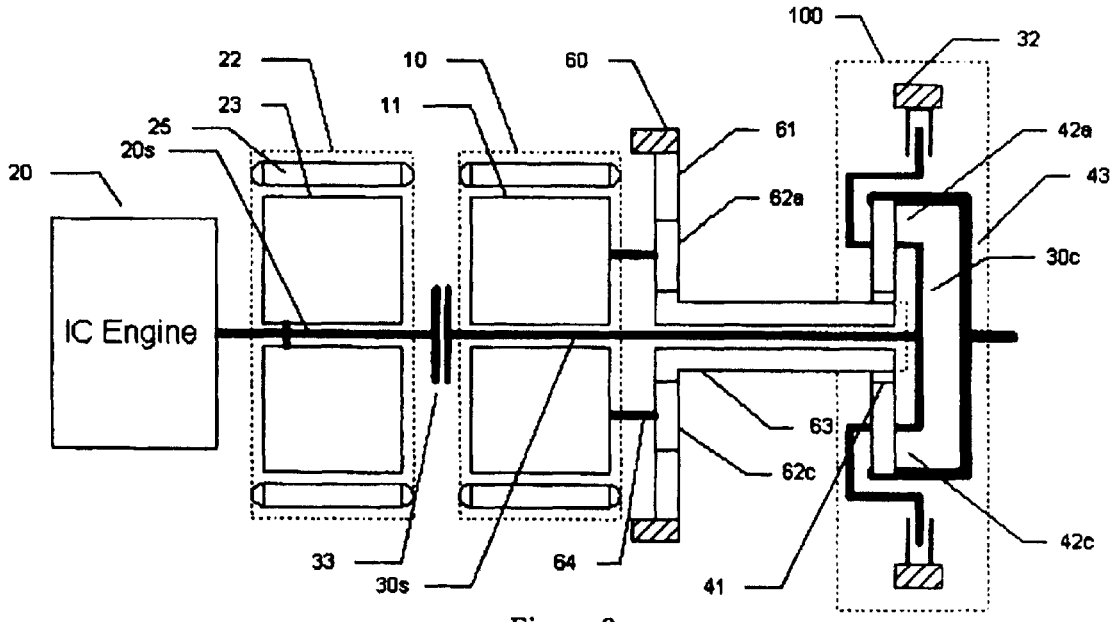
FIG. 8 is a schematic cross sectional view of an in-line parallel hybrid electric vehicle transmission incorporating a power combining apparatus according to a fourth alternate embodiment of the present invention.

FIGS. 6, 7, and 8 provide additional embodiments for accommodating a motor that is not optimally sized to the vehicle horsepower requirements associated with a particular HEV. The embodiment shown in FIG. 6 is similar to FIG. 5 but utilizes an additional planetary reduction assembly 60 that includes a ring gear 61 fixed to the external wall of the casing, planetary gears 62a–62c journaled to carrier 64, and sun gear 63 coupled to the rotor shaft 11 of motor 10. The motor rotor 11 drives into the planetary reduction assembly 60 through the sun gear 63. The carrier 64 of the planetary reduction assembly drives the sun gear 41 of the collector transmission 100.

An alternative embodiment shown in FIG. 7 is similar to the previous embodiment shown in FIG. 6 in that it uses a planetary reduction gear set 60 with a grounded carrier 64 to produce acceptable speed input for the combining gearbox 100.

Figure 9:
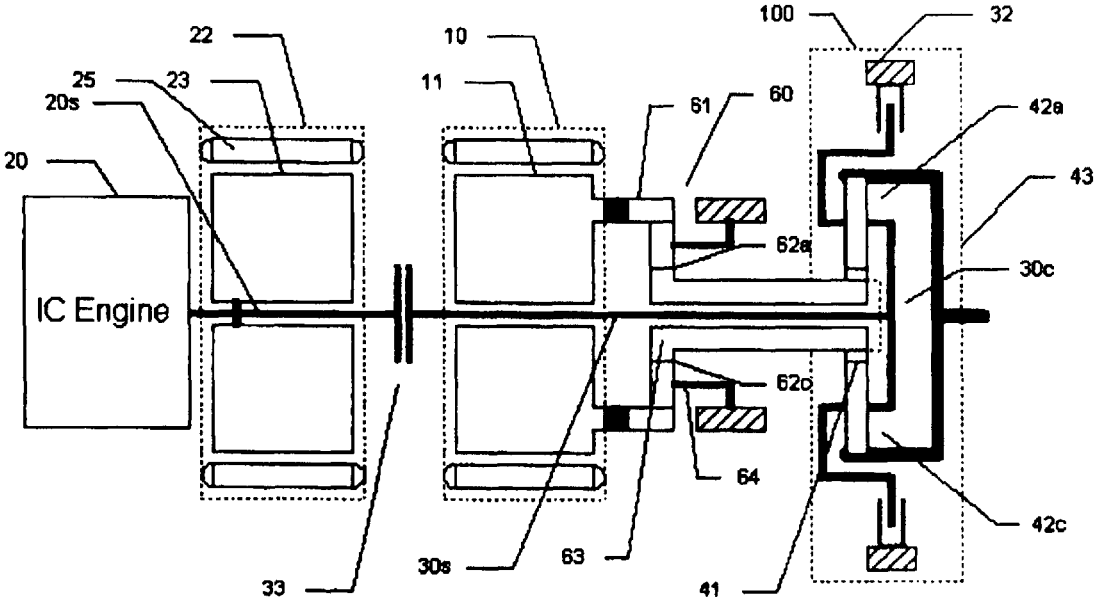
FIG. 9 is a schematic cross sectional view of an in-line parallel hybrid electric vehicle transmission incorporating a power combining apparatus according to a fifth alternate embodiment of the present invention.

The embodiments shown in FIGS. 8 and 9 use planetary gearbox 97 to act as a speed increaser. This is accomplished in two ways. By driving the motor rotor 11 into the carrier 64 and grounding the ring gear 61 it is possible to use a motor turning at a lower speed to drive the sun gear 63 to drive the collector transmission sun gear 41. This is shown in FIG. 8. As shown in FIG. 9, if the motor rotor 11 is used to drive the ring gear 61 and the carrier 64 is grounded a slower motor can be used to drive the combining gearbox. The different embodiments do not affect the modes of operation and as stated previously will allow for a more traditional installation in a vehicle.

Although the invention has been described and pictured in preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A vehicle transmission system adapted for receiving inputs from variable and constant power sources for driving an output shaft comprising:

a combining planetary gear arrangement having a plurality of members, *including a ring gear operatively coupled to said output drive shaft,* and operatively coupled to a rotatable shaft of said variable power source, *and* a rotatable shaft of said constant power source[, and to said output shaft];

a torque transmitting arrangement coupled to a member *other than said ring gear* of said combining planetary gear arrangement and responsive to said variable power source for influencing rotation of said *ring gear and said* output shaft according to rotation of said shaft of said variable power source; and a clutch for selectively connecting [the] *said* constant power source with another member *other than said ring gear* of [the] *said* combining planetary gear arrangement for establishing a drive path between said constant power source and said combining planetary gear arrangement for influencing rotation of [the] *said ring gear and said* output shaft according to rotation of [the] *said* constant power source shaft*;*

*wherein said system is operative in a first mode such that said ring gear and said output shaft are driven by said variable power source, in a second mode such that said ring gear and said output shaft are driven by said constant power source, and in a third mode such that said ring gear and said output shaft are driven by the combination of said variable and constant power sources.*

2. The system according to claim 1, wherein said plurality of members of said combining planetary gear arrangement [include] *further includes* a sun gear, [a ring gear], a plurality of planet gears, and a carrier assembly rotatably supporting the plurality of planet gears journaled with said sun and ring gears.

3. The system according to claim 2, wherein said ring gear is directly coupled to said output shaft.

4. The system according to claim 2, wherein said member coupled to said torque transmitting arrangement is said sun gear.

5. The system according to claim 2, wherein said another member of said combining planetary gear arrangement is said carrier.

6. The system according to claim 1, wherein said torque transmitting arrangement comprises a bull gear connected to a pinion gear.

7. The system according to claim 1, wherein said variable power source comprises an at least one electric motor.

8. The system according to claim 6, wherein said at least one electric motor is a reversible motor.

9. The system according to claim 1, wherein said constant power source comprises an internal combustion engine operating at a constant speed.

10. The system according to claim 1, further comprising a brake for selectively grounding said another member of said planetary gear arrangement and said constant power source connected therewith for preventing operation of said output shaft from influence by rotation of said shaft of said constant power supply.

[11. The system according to claim 10, wherein said system is operative in a first mode such that said output shaft is driven by said mechanical power source, in a second mode such that said output shaft is driven by said variable power source, and in a third mode such that said output shaft is driven by the combination of said variable and constant power sources.]

12. The system according to claim 9, wherein said variable power supply is driven to substantially a synchronizing speed to cause said transmission system to change modes.

13. A vehicle transmission system *adapted for receiving inputs from variable and constant power sources for driving an output shaft* comprising:

a planetary gear set comprising a sun gear, a ring gear connected to [an] *said* output shaft, a plurality of planet gears, and a carrier assembly rotatably supporting the plurality of planet gears journaled with said sun and ring gears; and a torque transmitting arrangement coupled to said sun gear and to [the] *a* shaft of said variable power source for influencing rotation of said sun gear according to the rotation of said variable power [supply] *source* shaft for causing rotation of said sun gear, thereby influencing rotation of said ring gear and said output shaft;

wherein [the] *said* carrier assembly of said planetary gear [arrangement] *set* is selectively connectable to said constant power source for selectively influencing rotation of said carrier assembly, [of] said [planetary] *planet* gears and said ring gear, to thereby influence rotation of said output shaft*; and*

*further wherein said system is operative in a first mode such that said ring gear and said output shaft are driven by said variable power source, in a second mode such that said ring gear and said output shaft are driven by said constant power source, and in a third mode such that said ring gear and said output shaft are driven by the combination of said variable and constant power sources.*

14. The system according to claim 13, wherein said torque transmitting arrangement comprises a pinion gear connected to a bull gear.

15. The system according to claim 14, wherein said bull gear is directly connected to said sun gear.

16. The system according to claim 13, further comprising a clutch for selectively connecting [the] *said* carrier assembly of said planetary gear [arrangement] *set* to said constant power source.

17. The system according to claim 16, further comprising a brake for selectively grounding said carrier assembly and said constant power source connected therewith for preventing operation of said output shaft from influence by rotation of [said] *a* shaft of said constant power source.

18. A vehicle transmission system having [a] *an output* drive shaft which can be driven continuously or at varying speeds and operable in a first mechanical mode, a second electrical mode, or a *third* combined mode of operation, comprising:

a combining planetary gear arrangement having a plurality of members*, including a ring gear operatively coupled to said output drive shaft,* and operatively coupled to a rotatable shaft of a variable power source, *and* a rotatable shaft of a constant power source[, and to said output drive shaft];

a clutch and brake mechanism operable in said first and third modes for connecting said constant power source with a member *other than said ring gear* of said combining planetary gear arrangement for establishing a drive path between said combining planetary gear arrangement and said constant power source for influencing rotation of said *ring gear and said* output *drive* shaft according to a rotation direction of [the] *said* constant power source shaft, and in said second mode for grounding said member of said combining planetary gear arrangement for preventing rotation of said output drive shaft from being influenced by [the] *said* constant power source; and a torque transmitting arrangement coupled to another member *other than said ring gear* of said combining planetary gear arrangement and responsive to said variable power source for influencing rotation of said *ring gear and said* output *drive* shaft according to a rotation direction of said shaft of said variable power source in said second and third modes of operation, and in said first mode of operation, for producing sufficient torque to prevent rotation of said another member for preventing rotation of said output drive shaft from being influenced by [the] *said* variable power source.

19. The system according to claim 18, wherein said variable power supply is driven to substantially a synchronizing speed to cause said transmission system to change modes.

20. The system according to claim 18, wherein said planetary gear arrangement *further* comprises a sun gear, [a] *said* ring gear *being* connected to said output *drive* shaft, a plurality of planet gears, and a carrier assembly rotatably supporting [the] *said* plurality of planet gears journaled with said sun and ring gears.

21. The system according to claim 20, wherein said torque transmitting arrangement comprises a pinion connected to a bull gear, and wherein said variable power source comprises one or more reversible electric motors speed synchronized and connected through said pinion and bull gear to said combining planetary gear arrangement via said sun gear.

* * * * *